United States Patent [19]

Ito

[11] Patent Number: 5,122,789

[45] Date of Patent: Jun. 16, 1992

[54] VIDEO DISPLAY CONTROLLER FOR ENLARGING VISUAL IMAGES DEPENDING UPON DISPLAY UNIT

[75] Inventor: Shuhei Ito, Shizuoka, Japan

[73] Assignee: Yamaha Corporation, Hamamatsu, Japan

[21] Appl. No.: 528,098

[22] Filed: May 24, 1990

[30] Foreign Application Priority Data

May 26, 1989 [JP] Japan .................. 1-133722

[51] Int. Cl.$^5$ .............................................. G09G 1/05
[52] U.S. Cl. ....................................... 340/731; 340/814; 340/798; 340/750; 358/451
[58] Field of Search ............... 340/814, 731, 750, 813, 340/748, 728, 798, 799; 358/451, 442, 140

[56] References Cited

U.S. PATENT DOCUMENTS 4,439,762  3/1984  Van Vliet et al. ............. 340/750
4,935,731  6/1990  Takebe et al. ................. 340/731

Primary Examiner—Ulysses Weldon
Assistant Examiner—Chanh Nguyen
Attorney, Agent, or Firm—Burns, Doane, Swecker & Mathis

[57] ABSTRACT

A video display controller supplies a raster address signal to a video memory for sequentially reading out a series of video data codes, and comprises a first data register for memorizing a control data code indicative of a bit length to be circulated in a rewritable manner, a second register for memorizing a repetition rate code indicative of a repetition pattern of the raster address in a rewritable manner, a combination of a shift register and a selector supplied with the repetition rate code in synchronism with a frame clock signal and circulating the data bits of the repetition code indicated by the control data code in synchronism with a line clock signal and a raster counter responsive to an enable signal fed from the selector and latching the line clock signal for incrementing the raster address, wherein the raster address is incremented or maintained depending upon the data bit at a predetermined bit position serving as the enable signal, so that the series of video data codes are repeatedly read out from the video memory for enlarging visual images on a screen.

7 Claims, 7 Drawing Sheets

| LO | L1 | L1/LO | REPETITION RATE CODE | | | | | | | | CONTROL DATA CODE | | L1* |
|---|---|---|---|---|---|---|---|---|---|---|---|---|---|
| | | | DD0 | DD1 | DD2 | DD3 | DD4 | DD5 | DD6 | DD7 | CD1 | CD0 | |
| 200 | 200 | 1 | 1 | 1 | 1 | 1 | 1 | 1 | 1 | 1 | 1 | 1 | 200 |
| | 350 | 7/4 | * | 1 | 0 | 1 | 0 | 1 | 0 | 1 | 1 | 0 | 350 |
| | 400 | 2 | 1 | 0 | 1 | 0 | 1 | 0 | 1 | 0 | 1 | 1 | 400 |
| | 480 | 12/5 = 7/3 | * | 1 | 0 | 0 | 1 | 0 | 1 | 0 | 1 | 0 | 467 |
| 350 | 350 | 1 | 1 | 1 | 1 | 1 | 1 | 1 | 1 | 1 | 1 | 1 | 350 |
| | 400 | 8/7 | 1 | 0 | 1 | 1 | 1 | 1 | 1 | 1 | 1 | 1 | 400 |
| | 480 | 48/35=8/6 | 1 | 0 | 1 | 1 | 1 | 0 | 1 | 1 | 1 | 1 | 467 |
| 400 | 400 | 1 | 1 | 1 | 1 | 1 | 1 | 1 | 1 | 1 | 1 | 1 | 400 |
| | 480 | 6/5 | * | * | 1 | 0 | 1 | 1 | 1 | 1 | 0 | 1 | 480 |
| 480 | 480 | 1 | 1 | 1 | 1 | 1 | 1 | 1 | 1 | 1 | 1 | 1 | 480 |

| LO | L1 | L1/LO | \multicolumn{8}{c}{REPETITION RATE CODE} | \multicolumn{2}{c}{CONTROL DATA CODE} | L1' |

| LO | L1 | L1/LO | DD0 | DD1 | DD2 | DD3 | DD4 | DD5 | DD6 | DD7 | CD1 | CD0 | L1' |
|---|---|---|---|---|---|---|---|---|---|---|---|---|---|
| 200 | 200 | 1 | 1 | 1 | 1 | 1 | 1 | 1 | 1 | 1 | 1 | 1 | 200 |
|  | 350 | 7/4 | * | 1 | 0 | 1 | 1 | 1 | 1 | 1 | 1 | 0 | 350 |
|  | 400 | 2 | 1 | 0 | 1 | 0 | 1 | 0 | 1 | 0 | 1 | 1 | 400 |
|  | 480 | 12/5≒7/3 | * | 1 | 0 | 0 | 1 | 0 | 1 | 0 | 1 | 0 | 467 |
| 350 | 350 | 1 | 1 | 1 | 1 | 1 | 1 | 1 | 1 | 1 | 1 | 1 | 350 |
|  | 400 | 8/7 | 1 | 0 | 1 | 1 | 1 | 1 | 1 | 1 | 1 | 1 | 400 |
|  | 480 | 48/35≒8/6 | 1 | 0 | 1 | 1 | 0 | 1 | 1 | 1 | 1 | 1 | 467 |
| 400 | 400 | 1 | 1 | 1 | 1 | 1 | 1 | 1 | 1 | 1 | 1 | 1 | 400 |
|  | 480 | 6/5 | * | * | 0 | 1 | 1 | 1 | 1 | 1 | 0 | 1 | 480 |
| 480 | 480 | 1 | 1 | 1 | 1 | 1 | 1 | 1 | 1 | 1 | 1 | 1 | 480 |

FIG. 4

VIDEO DISPLAY CONTROLLER FOR ENLARGING VISUAL IMAGES DEPENDING UPON DISPLAY UNIT

FIELD OF THE INVENTION

This invention relates to a visual image reproducing system and, more particularly, to a video display controller enlarging visual images depending upon the number of lines on the screen of a display unit.

DESCRIPTION OF THE RELATED ART

Various video display units are offered to a system composer, and one of the video display units is usually incorporated in a visual image reproducing system under the supervision of a microprocessor. The video display units are respectively fabricated on the basis of different principles, and are referred to as the cathode ray tube video display unit, the plasma video display unit, the liquid crystal video display unit and so forth. When the video display units are different in the principle, one video display unit is usually different in the number of lines on the screen from another video display unit. Moreover, even though the principle is similar, there is a wide variety of screen size, and, accordingly, the number of lines on the screen may be varied with the screen size.

On the other hand, visual images are reproduced on the screen on the basis of image data memorized in, for example, a video memory, and the image data are previously produced on the assumption that a predetermined video display unit is incorporated in the visual image reproducing system. In other words, a designer formats the image data so as to reproduce visual images in a single frame consisting of a predetermined number of the lines. This means that the images loses the lowest part thereof or accompanies a blank at the lowest portion of the screen if a different video display unit is coupled.

In order to cope with such an impropriety, two approaches have been proposed.

First, when the visual image reproducing system is equipped with a video display unit different from the predetermined type, a non-noticeable image such as a border is inserted into the blank.

Second, a part of the visual images assigned to a line is repeated in the next horizontal lines so that the part of the visual image is enlarged in the vertical direction of the screen of a video display unit provided wit a larger number of the lines. In this second approach, the video display unit repeats a part of visual images assigned to a line predetermined times, and the repetition rate is never incremented or decremented in response to an instruction given by an user.

However, a problem is encountered in the first approach in that the visual images reproduced are deviated on the screen of the different video display unit. In detail, when visual images are arranged in a single frame, the designer takes the aspect ratio of the screen into account. However, the visual images are reproduced in an upper area of left side on the screen of the different video display unit, and the user feels difficult to discriminate the visual images. The first approach is further causative of deformation of the visual images because video signals enlarges the visual images in the lateral direction only.

Moreover, the second approach is not always free from the problem inherent in the first approach because the number of the lines on screen is fallen within a wide range. As described hereinbefore, the repetition rate is fixed to a predetermined value, and the second approach may be effective against some video display units within a narrow range, however, the second approach is hardly responsible to other video display units out of the narrow range.

SUMMARY OF THE INVENTION

It is therefore an important object of the present invention to provide a video display controller which is responsible to various kinds of video display unit so that visual images are enlarged both lateral and vertical directions.

It is also an important object of the present invention to provide a visual image reproducing system which automatically enlarges visual images on a screen depending upon the number of the lines on the screen.

To accomplish these objects, the present invention proposes to change a repetition rate code as well as an associated control code so as to produce a raster address at different intervals.

In accordance with one aspect of the present invention, there is provided a video display controller associated with a video memory and a video display unit and producing an address signal fed to the video memory and frame and line clock signals fed to the video display unit, comprising: a) a clock signal producing circuit responsive to an external clock signal and producing the frame clock signal for a vertical synchronization between a video signal and a screen scanning carried out in the video display unit and the line clock signal for a horizontal synchronization between the video signal and a line scanning on the screen of the video display unit; b) a first data register for memorizing a control data code indicative of a bit length to be circulated in a rewritable manner c) a second data register for memorizing a multi-bit repetition rate code having a bit string indicative of a repetition pattern of the address signal in a rewritable manner; d) a shift register supplied from the second data register with the repetition rate code in the presence of the frame clock signal and shifting the bit string in a predetermined direction in synchronism with the line clock signal; e) an address counter responsive to an enable signal for latching the line clock signal and incrementing an address indicated by the address signal; and f) a selector supplied from the shift register with a part of data bits of the multi-bit repetition rate code and responsive to the control data code fed from the first data register for passing one of the data bits of the multi-bit repetition rate code at a predetermined bit position, in which the data bit at the predetermined bit position is supplied to the shift register so as to allow the data bits of the bit length to be circulated in the shift register, and in which the data bit at the predetermined bit position serves as the enable signal.

In accordance with another aspect of the present invention, there is provided a visual image reproducing system for reproducing visual images on the basis of video data codes comprising: a) a supervising section maintaining a plurality of multi-bit repetition rate codes each indicative of a bit length to be circulated and a plurality of control data codes each having a bit string indicative of a repetition pattern of the address signal; b) a visual image displaying section supplied with the video data codes and producing video signal for reproducing the visual image on a screen of a video display unit; and c) a system controller allowing the supervising section to communicate with the visual image displaying section, in which the visual image displaying section comprises b-1) a video memory for responsive to an address signal and memorizing the video data codes, b-2) a video display controller responsive to an external clock signal and producing the address signal fed to the video memory, a frame clock signal for a vertical synchronization between the video signal and a screen scanning carried out in the video display unit and a line clock signal for a horizontal synchronization between the video signal and a line scanning on the screen of the video display unit, b-3) a video signal generator coupled to the video display unit and producing the video signal, and b-4) a graphic controller for transferring the video data codes to the video signal generator, and in which the video display controller comprises a clock signal producing circuit responsive to the external clock signal and producing the frame clock signal and the line clock signal, a first data register supplied with one of the control data codes and memorizing the one of the control data codes in a rewritable manner, a second data register supplied with one of the multi-bit repetition rate codes and memorizing the one of the multi-bit repetition rate codes in a rewritable manner, a shift register supplied from the second data register with the repetition rate code in the presence of the frame clock signal and shifting the bit string in a predetermined direction in synchronism with the line clock signal, an address counter responsive to an enable signal for latching the line clock signal and incrementing an address indicated by the address signal, and a selector supplied from the shift register with a part of data bits of the multi-bit repetition rate code and responsive to the control data code fed from the first data register for passing one of the data bits of the multi-bit repetition rate code at a predetermined bit position, wherein the data bit at the predetermined bit position is supplied to the shift register so as to allow the data bits of the bit length to be circulated in the shift register, the data bit at the predetermined bit position serving as the enable signal.

BRIEF DESCRIPTION OF THE DRAWINGS

The features and advantages of a video display controller according to the present invention will be more clearly understood from the following description taken in conjunction with the accompanying drawings in which:

FIG. 4 shows a table of the repetition rate codes and the associated control data codes supplied from a floppy disk to a random access memory incorporated in the visual image reproducing system shown in FIG. 1;

DESCRIPTION OF THE PREFERRED EMBODIMENT

System Arrangement

Figure 1:
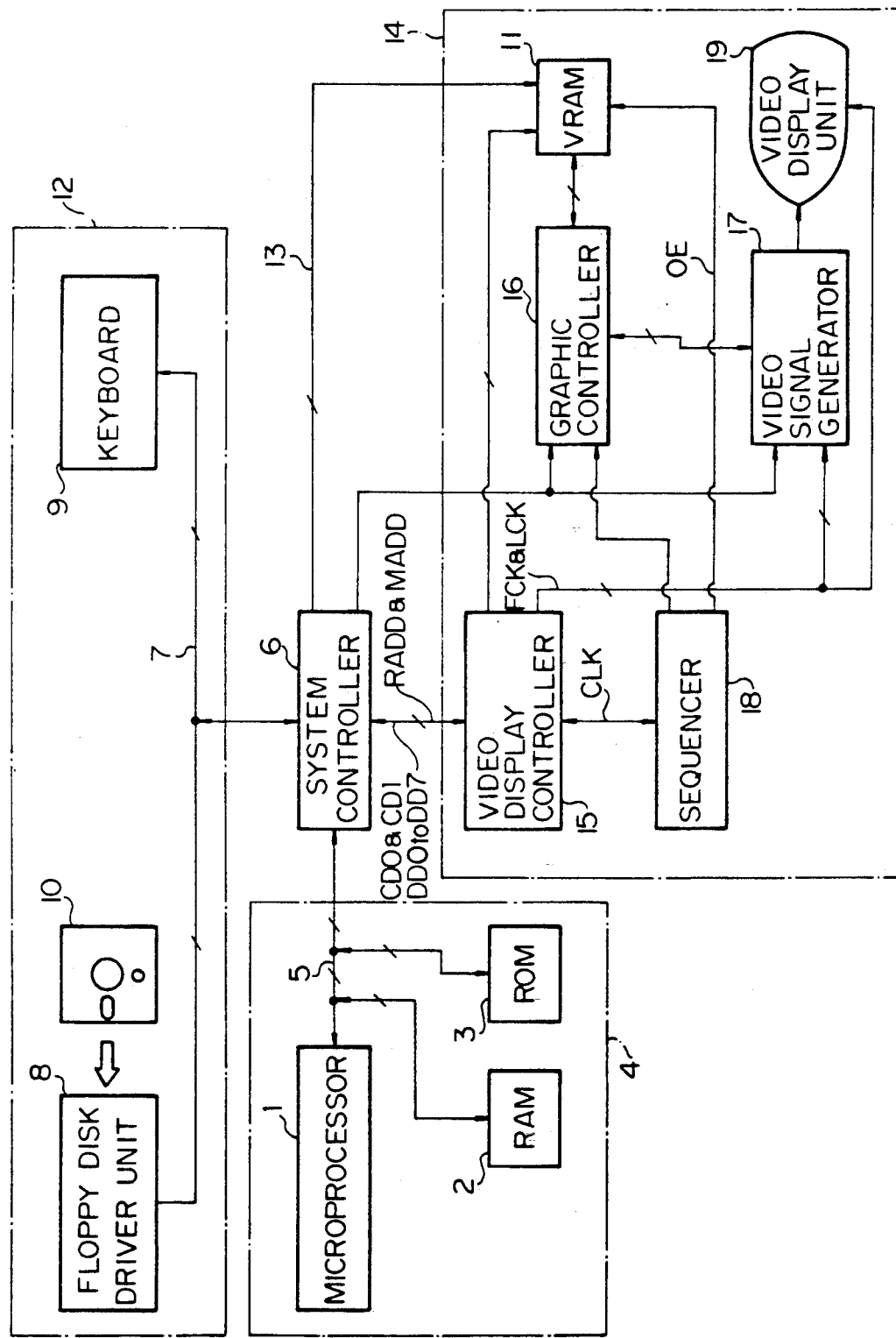
FIG. 1 is a block diagram showing the arrangement of a visual image reproducing system embodying the present invention.

Referring first to FIG. 1 of the drawings, a visual image reproducing system embodying the present invention comprises a microprocessor 1 serving as a central processing unit, a random access memory 2 for a data storage and a read only memory 3 for an instruction code storage, and these component devices 1 to 3 form in combination a supervisor section 4. The microprocessor 1 is coupled through a multi-bit bus system 5 to a system controller 6, and the system controller 6 is provided with an interface unit and associated register array so as to allow the microprocessor 1 to communicate with other component units. In detail, the system controller 6 is coupled through a multi-bit bus system 7 to a floppy disk driver unit 8 as well as a keyboard unit 9, and a floppy disk 10 is loaded into the floppy disk driver unit prior to starting a visual image reproducing operation. In the floppy disk 10 are memorized system data and video data which are respectively coded into predetermined data formats, and, for this reason, each piece of the system data and each piece of the video data are referred to as "system data code" and "video data code", respectively. The system data codes are transferred from the floppy disk 10 to the random access memory 2 by the microprocessor 1, but the video data codes are sequentially transferred to a video memory 11 (which is abbreviated as "VRAM" in FIG. 1). The keyboard 9 is provided for a user, and the user gives instructions to the microprocessor 1 through the keyboard 9. For this reason, the microprocessor 1 periodically scans manipulation keys on the keyboard 1 to see whether or not any one of the manipulation keys is depressed by the user, and interprets the instruction given by the user through a software if any. The floppy disk driver unit 8 with the floppy disk 10 and the keyboard 9 as a whole constitute a data source section 12.

The system controller 6 is further coupled through another multi-bit data bus system 13 to the video memory 11 and the multi-bit data bus system 13 propagates the video data codes. The video memory 11 forms a part of a visual image displaying section 14 together with a video display controller 15, a graphic controller 16, a video signal generator 17, a sequencer 18 and a video display unit 19.

The video display controller 15 produces and supplies a raster address signal RADD indicative of a head address of a series of address locations to the video memory 11 and a memory address signal MADD indicative of one of the address locations so that each video data code is written into or read out from the address locations indicated by a combination of the raster address signal RADD and the memory address signal MADD. Although the video display controller 15 further produces a refreshing address, no description is incorporated hereinbelow because of the indirect conjunction with the gist of the present invention. The raster address signal RADD and the memory address signal MADD are fed to the system controller 6, and the system controller 6 transfers the raster address signal RADD and the memory address signal MADD to the video memory 11.

The video display controller 15 further produces a frame clock signal FCK (or a vertical synchronizing signal) and a line clock signal LCK (or a horizontal synchronizing signal), and these clock signals FCK and LCK are sequentially supplied to the video signal generator 17 and the video display unit 19. The sequencer 18 supplies a synchronous clock signal CLK to the video display controller 15, and the synchronous clock signal CLK is used for producing the frame and line clock signals FCK and LCK. The video memory 11 and the graphic controller 16 are also under the control of the sequencer 18, and the video data code is read out from the video memory 11 to the graphic controller 16 in response to an output enable signal OE fed from the sequencer 18. The graphic controller 16 transfers the video data code to the video signal generator 17, and the video signal generator 17 produces a video signal (such as, for example, a color composite video signal) in synchronism with the frame and line clock signals FCK and LCK. The video signal thus produced between the two frame clock signals FCK is supplied to the video display unit 19, and reproduces visual images or a final picture in a single frame on the screen of the video display unit 19. If the video display unit 19 is of the cathode ray tube type, a luminous spot starts from the leftmost point of the uppermost line in synchronization with the frame clock FCK and moves along the uppermost line. When the line clock signal LCK is supplied to the video display unit 19, the luminous spot returns to the left side and trace the second line of the screen.

The production of the frame clock signal FCK and the line clock signal LCK is not directly related to the present invention, but description is made in detail on the production of the raster address signal RADD for better understanding.

Arrangement of the Video Display Controller

Figures 2, 3:
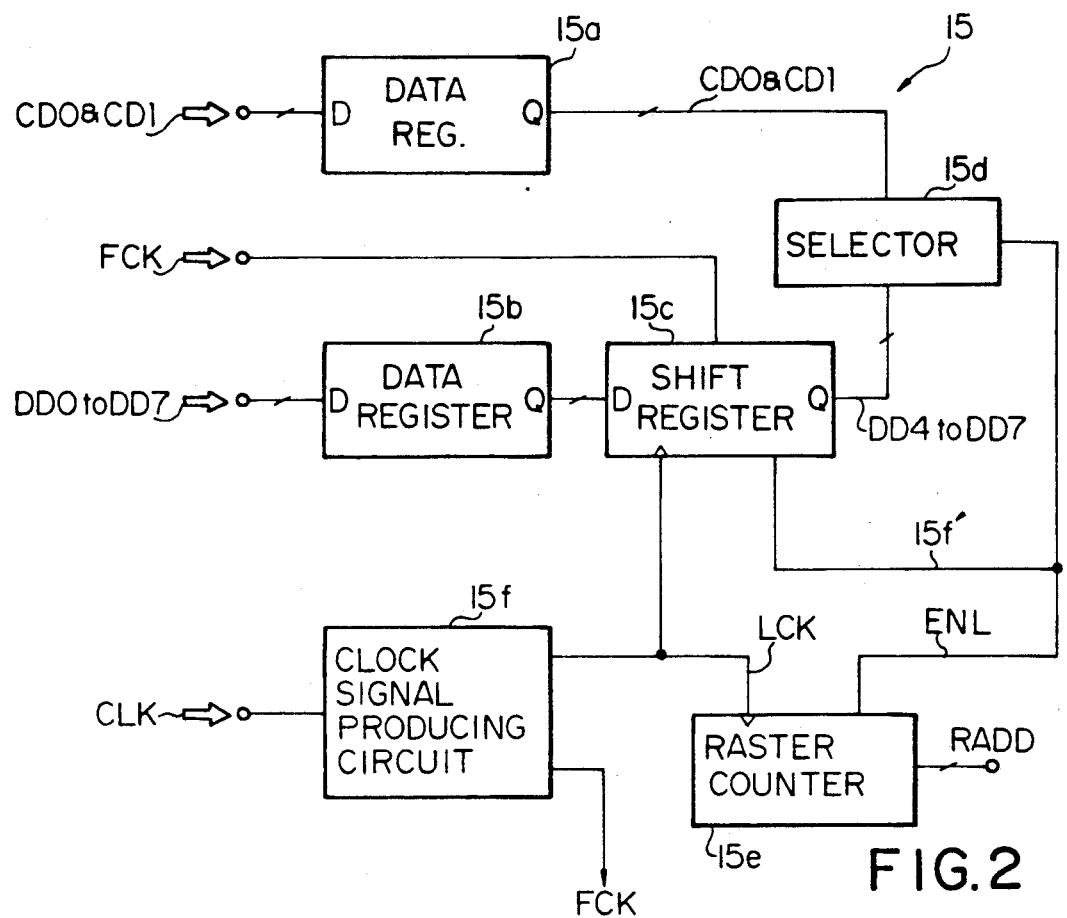
FIG. 2 is a block diagram showing the arrangement of a video display controller incorporated in the visual image reproducing system shown in FIG. 1.
FIG. 3 shows a table of component bits of a repetition rate code selected in the presence of a control data code.

Turning to FIG. 2 of the drawings, an essential part of the video display controller 15 is illustrated in detail, and comprises a first data register 15a for storing a two-bit control data code CD0 and CD1 in a rewritable manner, a second data register 15b for storing an eight-bit repetition rate code DD0 to DD7 in a rewritable manner, a shift register 15c, a selector 15d and a raster counter 15e. The video display controller 15 further comprises a control signal producing circuit 15f, and the control signal producing circuit 15f is responsive to the system clock signal CLK so as to produce the frame clock signal FCK and the line clock signal LCK. However, the production of these clock signals FCK and LCK are familiar with the person skilled in the art, and, for this reason, no further description is incorporated hereinbelow.

The control data code CD0 and CD1 is fed from the microprocessor 1 through the system controller 6 to the first data register 15a, and the first data register 15a transfers the control data code to the selector 15d. The repetition rate code DD0 to DD7 are also transferred from the microprocessor 1 through the system controller 6 to the second data register 15b, and the repetition rate code is transferred to the shift register 15c in the presence of the frame clock signal FCK. The shift register 15c is responsive to the line clock signal LCK, and shifts the bit string of the repetition code in synchronism with the line clock signal LCK. High order data bits DD4 to DD7 are supplied from the shift register 15c to the selector 15d, and the selector 15d selects one data bit from the high order data bits DD4 to DD7 in response to the control data code CD0 and CD1. As shown in FIG. 3, when the control data code CD0 and CD1 are (0,0), the selector 15d is transparent to the fifth data bit DD4 as indicated on the first row of the table, however, the control data code CD0 and CD1 of (1,0) results in the sixth data bit DD5, the control data code CD0 and CD1 of (0,1) causes the selector 15d to be transparent to the seventh data bit DD6, and the control data code CD0 and CD1 of (1,1) allows the eighth data bit DD7 to pass through the selector 15d. The output node of the selector 15d is coupled to both of the input node of the shift register 15c and the input node of the raster counter 15e, and the feedback path 15f between the selector 15d and the shift register 15c allows the bit string of the repetition rate code to recycle in the shift register 15c. A signal fed from the selector 15d to the raster counter 15e is referred to as "latching enable signal ENL", and the raster counter 15e is responsive to the latching enable signal ENL. Namely, when the latching enable signal ENL goes up to an active high level, the line clock signal LCK is latched by the raster counter 15e, and the eight-bit raster address signal RADD is incremented by one; however, any line clock signal LCK is ignored in the absence of the latching enable signal ENL of the active high voltage level.

FIG. 4 shows a table of the repetition rate codes DD0 to DD7 in terms of a ratio L1/L0. L0 indicates the number of lines on the screen of the current video display unit 19, L1 represents the number of lines on the screen of a new video display unit, and L1' stands for the number of lines of the new video display unit to be scanned in a single frame. Assuming now that the current video display having two hundreds lines (L0=200) is replaced with a new video display unit having three hundreds and fifty lines (L1=350), the ratio L1/L0 is equal to 7/4, then the microprocessor 1 supplies the repetition rate code of DD0 to DD7 of (*1010101) and the control data code CD0 and CD1 of (01) to the second and first data registers 15b and 15a, respectively. In the bit string, the mark (*) means "don't care". If the ratio L1/L0 is approximately equal to 7/3 or 8/6, the number of lines to be scanned is smaller than the total number of the new video display unit 19. This results in a blank in the lowest edge portion of the screen. However, the blank is so small that the user would not pay attention. The blank may be filled with a border.

In operation, the repetition rate code DD0 to DD7 of (*1010101) supplied from the microprocessor 1 is loaded into the shift register 15c in the presence of the frame clock signal FCK, and the higher order data bits DD4 to DD7 are supplied to the selector 15d. Since the control data code CD0 and CD1 is (01), the selector 15d is transparent to the seventh data bit DD6. Then, the data bit DD6 of (1) passes through the selector 15d and are, then, supplied to the raster counter 15e as well as the shift register 15c. The Shift register 15c shifts the bit string in a higher direction, and the data bit (1) at the input node thereof is placed to the least significant bit DD0. As a result, the seventh data bit DD6 is changed from (1) to (0), and selector 15d alternates the seventh data bit DD6 between (1) and (0) in synchronism with the line clock signal LCK, but the seventh data bit DD6 of (*) causes the seventh data bit DD6 to remain in the previous state. The latching enable signal ENL changes its level in synchronism with the seventh data bit DD6, and the waveform of the latching enable signal ENL is illustrated in FIG. 5.

Figure 5:
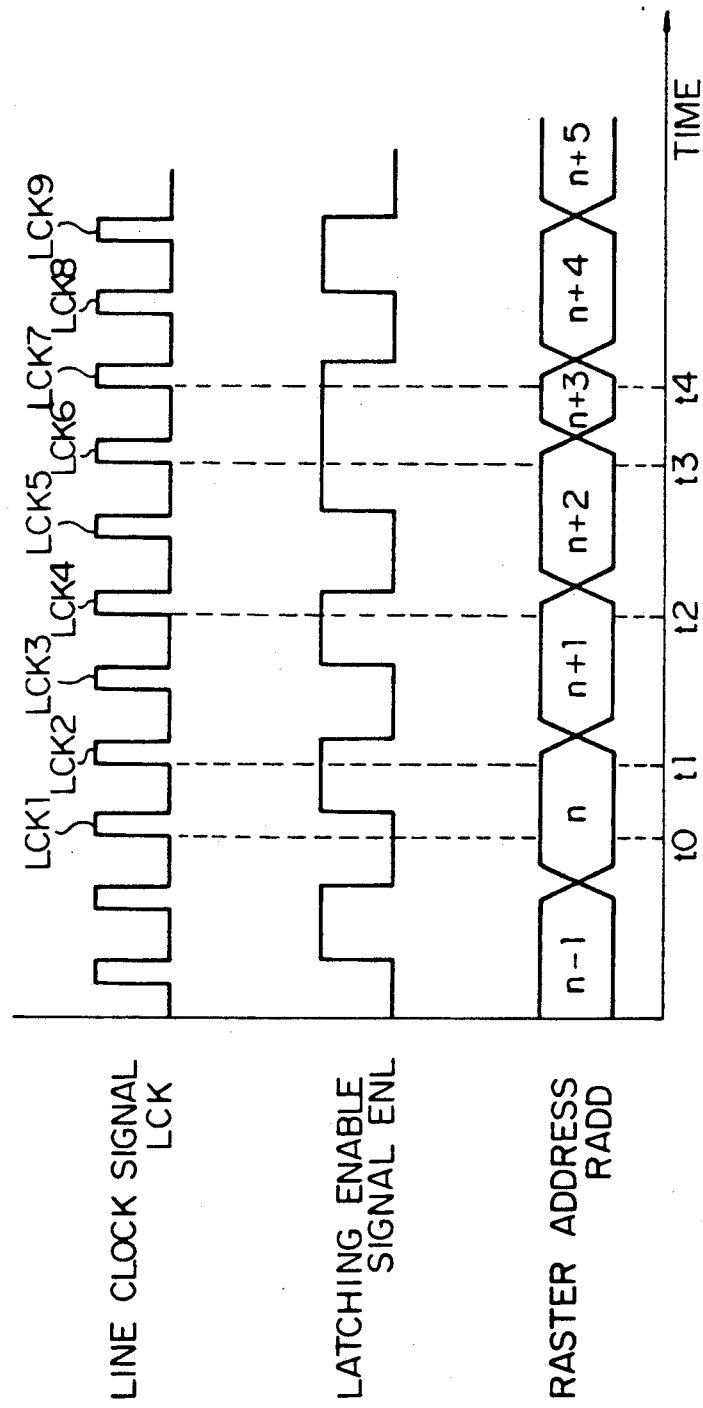
FIG. 5 is a flow chart showing the sequence of a main routine program.

Turning to FIG. 5 of the drawings, the line clock signal LCK periodically takes place at the clock nodes of the shift register 15c and the raster counter 15e. Assuming now that the raster address (n) is maintained in the raster counter 15e at time t0, the first line clock pulse LCK1 is ignored at time t0 because the seventh data bit DD6 of (0) causes the selector 15d to produce the latching enable signal ENL of the low level. As a result, the raster address RADD remains in the value (n). With the line clock pulse LCK1, the seventh data bit DD6 is replaced with the previous sixth data bit DD5 (1), and the latching enable signal ENL goes up to the high level. Then, the second line clock pulse LCK2 is latched by the raster counter 15e in the presence of the latching enable signal ENL of the high level, and the counter value or the raster address signal RADD is incremented to (n+1). The second line clock pulse CLK2 further allows the new seventh data bit DD6 (or the previous sixth data bit DD5) to be replaced with the previous fifth data bit DD4 of (0).

The new seventh data bit DD6 (or the previous fifth data bit DD4) of (0) shifts the latching enable signal ENL to the low level, and the third line clock pulse CLK3 is ignored so that the raster address signal RADD remains in the value of (n+1). However, the third line clock pulse CLK3 allows the seventh data bit DD6 (or the previous fifth data bit DD4) to be replaced with the previous fourth data bit DD3 of (1), and the latching enable signal ENL of the high level is supplied to the raster counter 15e. With the latching enable signal of the high level, the fourth line clock pulse LCK4 is latched by the raster counter 15e at time t2, and the raster address signal RADD is incremented to (n+2).

The fourth line pulse LCK4 is causative of replacement of the seventh data bit DD6 (or the previous fourth data bit DD3) with the previous third data bit DD2 of (0), and the latching enable signal ENL is shifted to the deactive low level. Then, the fifth line clock pulse LCK5 is ignored by the raster counter 15e, and the raster address signal RADD remains in the value of (n+2). However, the fifth clock pulse LCK5 replaces the seventh data bit DD6 (or the previous third data bit DD2) with the previous second data bit DD1 of (1), and the new seventh data bit DD6 (or the previous second data bit DD1) shifts the latching enable signal ENL to the high level. With the latching enable signal ENL of the high level, the raster counter 15e latches the sixth line clock pulse LCK6 at time t3, and the raster address signal RADD is incremented to (n+3). The sixth line clock pulse LCK6 replaces the seventh data bit DD6 (or the previous second data bit DD1) with the least significant data bit DD0 of (*), and the least significant data bit of (*) allows the selector to keep the latching enable signal ENL in the previous high level. Then, the raster counter 15e latches the seventh line clock pulse LCK7 at time t4, and the raster address signal RADD is incremented to (n+4). The eighth line clock pulse LCK8 is ignored because of the previous seventh data bit DD6 of (0) which is fed back from the selector 15e to the shift register 15c. Thus, the repetition rate code DD0 to DD7 allows the raster address signal RADD to intermittently remains in the previous value, and, for this reason, a series of the video data codes are repeatedly read out from the video memory 11 to the graphic controller 16. This results in that the visual images or the final picture is enlarged in the vertical direction of the screen in accordance with the aspect ratio of the current video display unit 19 even if the current video display unit 19 is different in the number of lines on the screen from the predetermined video display unit assumed by the designer.

Replacement of the Video Display Unit

Description is made on replacement of the current video display unit 19 with a new video display unit different in the number of lines on the screen.

Figure 6:
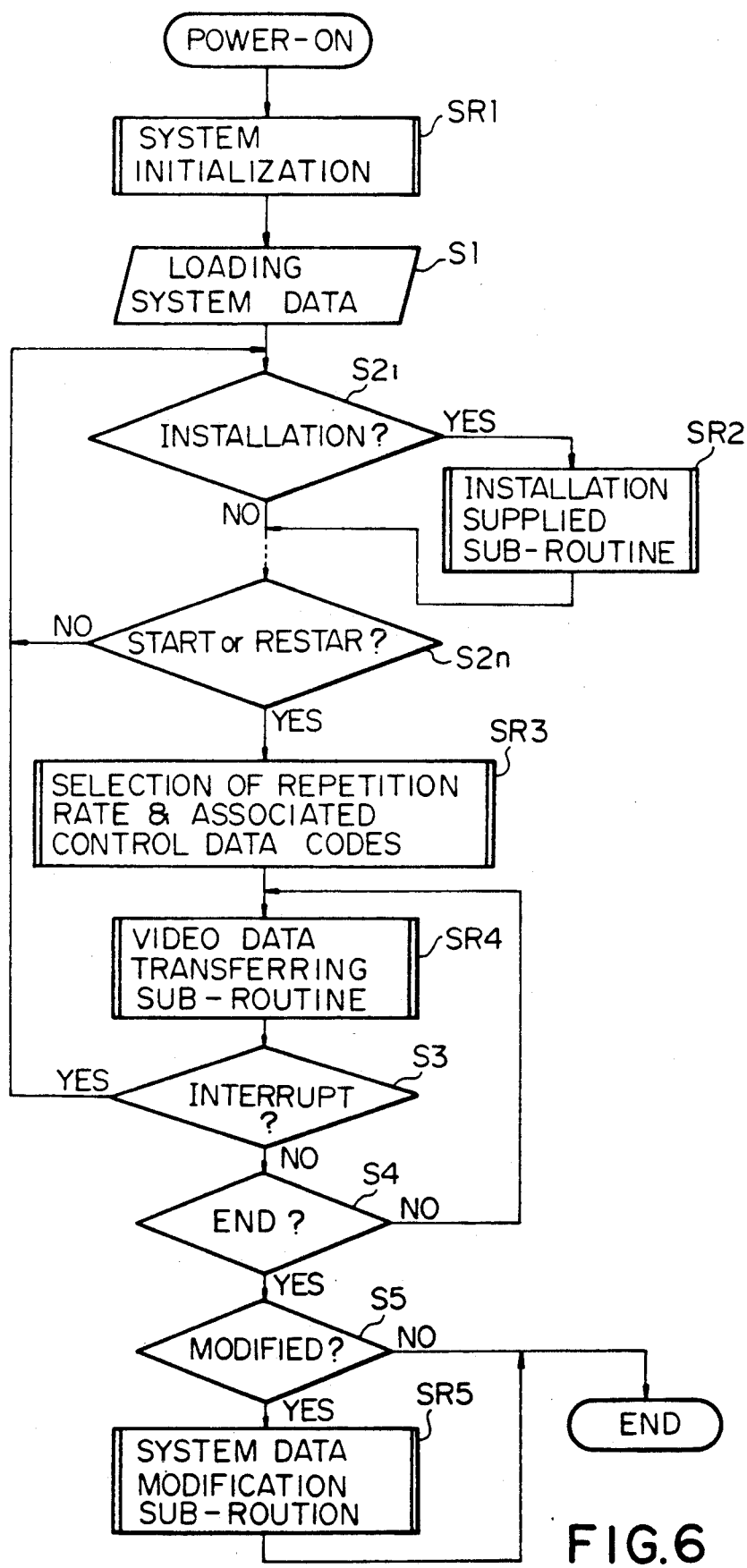
FIG. 6 is a flow chart showing the sequence of an installation-supplied sub-routine program executed upon installation of a new video display unit.

First, a main routine program is described with reference to FIG. 6. When a main switch turns on, the microprocessor 1 sequentially fetches instruction codes in the read only memory 3 and initializes the system as by step SR1. After the system initialization, the microprocessor 1 accesses the system data codes stored in the floppy disk 10, and the system data codes are transferred from the floppy disk driver unit 8 to the random access memory 2 as by step S1. The system data codes contains a table of video display units where names of various video display units are indicated together with the numbers of lines on the respective screens. The system data codes further contains a piece of data indicative of the number of lines L0 on the screen of the current video display unit 19 and the ratio L1/L0 calculated for the current video display unit 19. The table shown in FIG. 4 is further provided in the system data codes. The microprocessor has flags one of which is indicative of whether or not a video data transferring operation is completed and other of which is indicative of whether or not any modification takes place in the system data codes.

Figure 7:
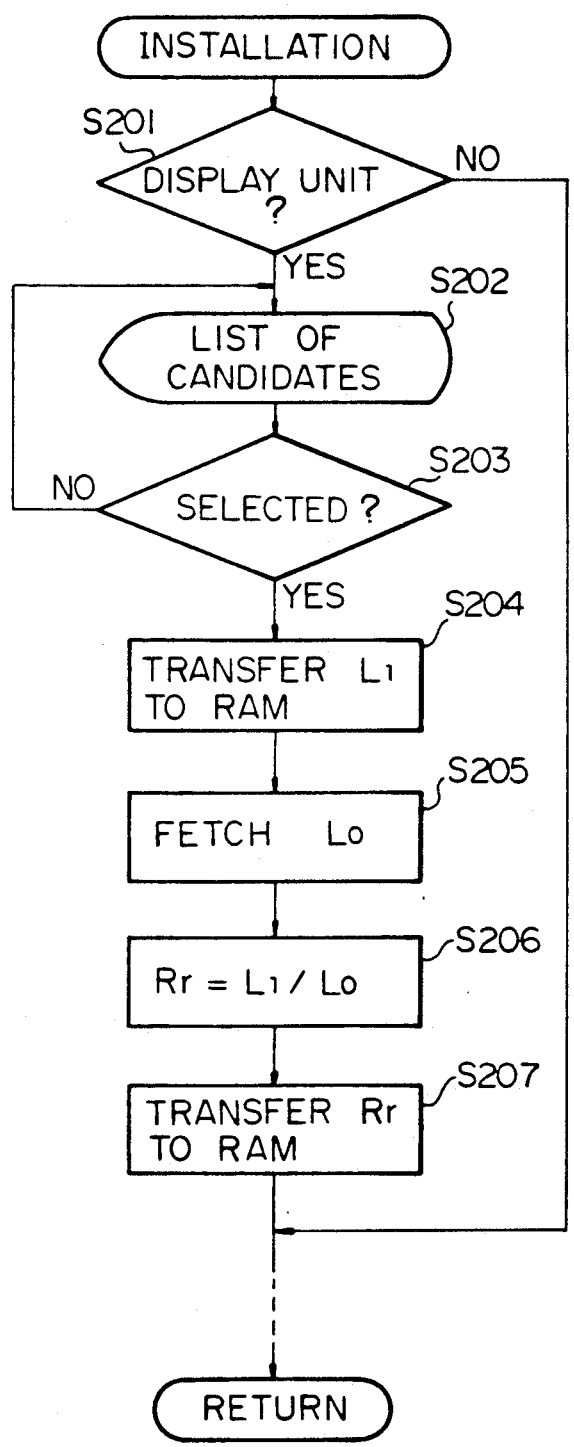
FIG. 7 is a flow chart showing the sequence of a repetition rate code and associated control data code selecting sub-routine program executed before a video data transferring sub-routine program.

The microprocessor then checks the keyboard 12 to see whether or not any key is manipulated for giving an instruction as by step S21 to S2n. Although a lot of keys are provided on the keyboard 1, the main routine program refers to a part of the keys related to the replacement of the video display unit 19. The microprocessor 1 reiterates the loop consisting of the step S21 to the step S2n until an instruction is given from the keyboard 9. At the decision step S21, the microprocessor 1 checks the keyboard 12 to see if the user requests an installation-supplied sub-routine program SR2. If there is found that no installation is requested, the microprocessor 1 proceeds to the next decision step. However, if the current video display unit 1 is replaced with a new video display unit different in the number of lines, the answer to the decision step S21 is affirmative, then the microprocessor 1 executes the installation-supplied sub-routine program SR2 illustrated in FIG. 7.

Namely, the microprocessor decides whether or not the user requests to install the new video display unit as by step S201. If the answer to the decision step S201 is given in the negative, the microprocessor 1 skips over steps S201 to S207 and checks the instruction to see what the user requests by repeating decision steps. However, if the answer to the decision step S021 is affirmative, the microprocessor proceeds to the step S202 and allows displaying the table of new video display units on the screen. The user scrolls up or down until the name of the new video display unit appears on the screen. While searching the name of the new video display unit, the answer to the decision step S203 is repeatedly given in the negative. However, if the user finds the name of the new video display unit on the screen, he specifies the name of the new video display unit, and, accordingly, the answer to the decision step S203 is given in the positive. Then, the microprocessor 1 proceeds to the step S204 and transfers a piece of data L1 indicative of the number of lines on the screen of the new video display unit to the random access memory 2. The microprocessor 1 then fetches the piece of data L0 indicative of the number of lines on the screen of the current display unit 19 as by the step S205, and calculates the ratio Rr which is given as follows:

$$Rr = L1/L0 \qquad \text{(Equation 1)}$$

After the calculation of the ratio Rr at the step S206, the microprocessor 1 transfers the ratio Rr to the random access memory 2 and memorizes it therein as by step S207. If there is no further installation, the microprocessor 1 returns to the main routine program.

Figure 8:
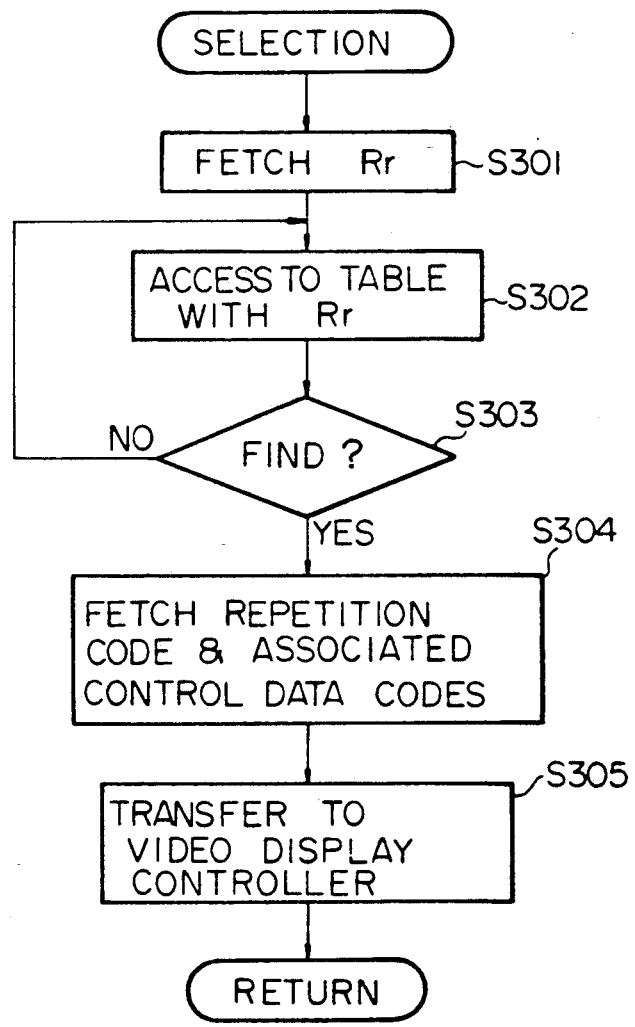
FIG. 8 is a diagram showing essential signals supplied to or produced in the video display controller.

When the user requests the microprocessor to reproduce the visual images on the screen of the new video display unit, the answer to the decision step S2n is affirmative, so that the microprocessor 1 proceeds to a code selection sub-routine program SR3 which is illustrated in FIG. 8 in detail.

When the microprocessor is branched to the code selection sub-routine program SR3, the ratio Rr calculated in the sub-routine program SR2 is transferred to one of the internal registers of the microprocessor 1 as by step S301, and the microprocessor 1 sequentially fetches the ratios L1/L0 in the table shown in FIG. 4 as by step S302. The ratios L1/L0 are sequentially compared with the ratio Rr to see if the ratios Rr and L1/L0 are matched with each other as by step S303. If there is found that the ratio L1/L0 is different from the ratio Rr, the answer to the decision step S303 is given in the negative, and the microprocessor returns to the step S302. Thus, the microprocessor 1 reiterates the loop consisting of the steps S302 and S303 until the answer to the decision step S303 is affirmative.

When the ratio L1/L0 is matched with the ratio Rr, the microprocessor 1 proceeds to step S304, and the repetition rate code DD0 to DD7 and the control data code CD0 and CD1 both associated with the ratio L1/L0 are fetched by the microprocessor 1 as by step S304. Then, the microprocessor 1 proceeds to step S305 and transfers the repetition rate code DD0 to DD7 and the control data code CD0 and CD1 to the data registers 15b and 15a of the video display controller 15. Thus, the repetition rate code DD0 to DD7 and the control data code CD0 and CD1 are memorized in the data registers 15b and 15a, respectively, and the microprocessor 1 returns to the main routine program.

After returning from the code selection sub-routine program, the microprocessor allows a part of the video data codes to be sequentially transferred from the floppy disk 10 to the video memory 11 in a video data transferring sub-routine program SR4, and the video display controller 15 causes the graphic controller 16 to read out the video data codes from the video memory 11. When the part of the video data codes were transferred to the video memory 11, the microprocessor proceeds to step S3 and checks the keyboard 12 to see if the user requests an interrupt or not. If no interrupt is requested, the microprocessor further checks one of the flags memorized therein to see whether or not all of the video data codes are transferred to the video memory 12 as by step S4. If the video data codes are still left in the floppy disk 10, the answer to the decision step S4 is given in the negative, and the microprocessor is branched into the video data transferring sub-routine program SR4 again. Thus, the microprocessor 1 reiterates the loop consisting of the sub-routine program SR4 and the steps S3 and S4 until the answer to the decision step S4 turns affirmative. However, if the user requests an installation again, the microprocessor returns from the step S3 to the step S21 so as to execute the installation-supplied sub-routine program SR2.

When all of the video data codes are transferred to the video memory 11, the answer to the decision step S4 is given in the positive, and the microprocessor 1 checks another flag to see if any modification takes place due to, for example, the execution of the installation-supplied sub-routine program SR2. If no modification takes place, the microprocessor terminates the execution of the main routine program. However, if the current video display unit 19 is replaced with the new video display unit, the system data codes should be modified, then the microprocessor 1 executes the system data modification sub-routine program SR5. In the system data modification sub-routine program SR5 the piece of data L0 is replaced with the piece of data L1 selected in the installation-supplied sub-routine program, and the ratio Rr calculated at the step S206 is added to the system data codes.

Thus, the repetition rate code DD0 to DD7 and the control data code CD0 and CD1 are changeable, and the video display controller 15 produces the raster address signal RADD on the basis of the repetition rate code DD0 to DD7 and the control data code CD0 and CD1. This results in that the visual images or the picture to be displayed on the screen is enlarged or shrunk depending upon the current video display unit, and the visual image reproducing system reproduces the picture at an appropriate size.

Although particular embodiment of the present invention has been shown and described, it will be obvious to those skilled in the art that various changes and modifications may be made without departing from the spirit and scope of the present invention.

What is claimed is:

1. A video display controller associated with a video memory and a video display unit and producing an address signal fed to the video memory and frame and line clock signals fed to said video display unit, comprising:
   a) a clock signal producing circuit responsive to an external clock signal and producing said frame clock signal for a vertical synchronization between a video signal and a screen scanning carried out in said video display unit and a line clock signal for a horizontal synchronization between the video signal and a line scanning on the screen of said video display unit;
   b) a first data register for memorizing a control data code indicative of a bit length to be circulated in a rewritable manner;
   c) a second data register for memorizing a multi-bit repetition rate code having a bit string indicative of a repetition pattern of said address signal in a rewritable manner;
   d) a shift register supplied from said second data register with said repetition rate code in the presence of said frame clock signal and shifting said bit string in a predetermined direction in synchronism with said line clock signal;
   e) an address counter responsive to an enable signal for latching said line clock signal and incrementing an address indicated by said address signal; and f) a selector supplied from said shift register with a part of data bits of said multi-bit repetition rate code and responsive to said control data code fed from said first data register for passing one of the data bits of said multi-bit repetition rate code at a predetermined bit position, in which the data bit at said predetermined bit position is supplied to said shift register so as to allow the data bits of said bit length to be circulated in said shift register, and in which the data bit at said predetermined bit position serves as said enable signal.

2. A video display controller as set forth in claim 1, in which said line clock signal repeatedly takes place from said frame clock signal and the next frame clock signal.

3. A video display controller as set forth in claim 1, in which said control data code specifies said bit position so that said data bits between the least significant bit position and said bit position are circulated.

4. A video display controller as set forth in claim 1, in which said multi-bit repetition rate code contains said data bits of a first logic level representative of production of said enable signal.

5. A video display controller as set forth in claim 4, in which said multi-bit repetition rate code further contains said data bits of a second logic level representative of extinguishing said enable signal.

6. A video display controller as set forth in claim 5, in which said multi-bit repetition rate code further contains at least one data bit representative of maintaining a previous state indicated by said data bit at a previous bit position.

7. A visual image reproducing system for reproducing visual images on the basis of video data codes comprising:
   a) a supervising section maintaining a plurality of multi-bit repetition rate codes each indicative of a bit length to be circulated and a plurality of control data codes each having a bit string indicative of a repetition pattern of an address signal;
   b) a visual image displaying section supplied with said video data codes and producing video signal for reproducing said visual image on a screen of a video display unit; and
   c) a system controller allowing said supervising section to communicate with said visual image displaying section, in which said visual image displaying section comprises
   b-1) a video memory for responsive to said address signal and memorizing said video data codes,
   b-2) a video display controller responsive to an external clock signal and producing said address signal fed to said video memory, a frame clock signal for a vertical synchronization between said video signal and a screen scanning carried out in said video display unit and a line clock signal for a horizontal synchronization between the video signal and a line scanning on the screen of said video display unit,
   b-3) a video signal generator coupled to said video display unit and producing said video signal, and
   b-4) a graphic controller for transferring said video data codes to said video signal generator, and in which said video display controller comprises a clock signal producing circuit responsive to said external clock signal and producing said frame clock signal and said line clock signal, a first data register supplied with one of said control data codes and memorizing said one of the control data codes in a rewritable manner, a second data register supplied with one of said multi-bit repetition rate codes and memorizing said one of the multi-bit repetition rate codes in a rewritable manner, a shift register supplied from said second data register with said repetition rate code in the presence of said frame clock signal and shifting said bit string in a predetermined direction in synchronism with said line clock signal, an address counter responsive to an enable signal for latching said line clock signal and incrementing an address indicated by said address signal, and a selector supplied from said shift register with a part of data bits of said multi-bit repetition rate code and responsive to said control data code fed from said first data register for passing one of the data bits of said multi-bit repetition rate code at a predetermined bit position, wherein the data bit at said predetermined bit position is supplied to said shift register so as to allow the data bits of said bit length to be circulated in said shift register, said data bit at said predetermined bit position serving as said enable signal.

* * * * *